US005230416A

United States Patent [19]

Itoh et al.

[11] Patent Number: 5,230,416

[45] Date of Patent: Jul. 27, 1993

[54] AUTOMATIC STOP DEVICE WITH SLIDING YOKE FOR ELECTRIC MOTOR

[75] Inventors: Kazuo Itoh; Kazuo Saegusa; Hiroshi Uchida, all of Kasai, Japan

[73] Assignee: Somfy, Cluses, France

[21] Appl. No.: 903,018

[22] Filed: Jun. 23, 1992

[30] Foreign Application Priority Data

Jul. 19, 1991 [FR] France ................................ 91 09173

[51] Int. Cl.[5] ............................ H01H 3/16; H02P 3/06

[52] U.S. Cl. ................................ 192/141; 192/142 R; 192/143; 318/467; 318/468

[58] Field of Search ........... 192/138, 139, 141, 142 R; 318/467, 468

[56] References Cited

U.S. PATENT DOCUMENTS 3,718,215 2/1973 Mimeur ................................ 192/141
4,238,021 12/1980 Lindner ................................ 192/141
4,396,813 8/1983 Hesselbart et al. ............. 192/141 X
5,111,925 5/1992 Evreux et al. ....................... 192/141

FOREIGN PATENT DOCUMENTS 1081553 5/1960 Fed. Rep. of Germany .
2714493 2/1978 Fed. Rep. of Germany .
2599524 12/1987 France .

*Primary Examiner*—Richard M. Lorence
*Attorney, Agent, or Firm*—Laff, Whitesel, Conte & Saret

[57] ABSTRACT

The device comprises at least one lead screw (2) driving a sliding yoke (23) whose guide bar (22) is mounted on a rocker arm (19). The lead screw actuates a switch (27) by means of a cam (28) via the sliding yoke. A deliberate action on the rocker arm moves away the sliding yoke (23) which is brought instantaneously into initial position by a spring (25). The lead screw (2) is for preference disengageable by means of an arm (29) driven by the axle of the sliding yoke. This arm provides an angular positioning of the lead screw by acting on a heart-shaped cam (10).

The device permits rapid, sure and precise setting of the stopping points of a motor.

8 Claims, 4 Drawing Sheets

AUTOMATIC STOP DEVICE WITH SLIDING YOKE FOR ELECTRIC MOTOR

FIELD OF THE INVENTION

The subject of the present invention is an automatic stop device for an electric motor after a certain number of revolutions, comprising a shaft driven in rotation by the motor and exhibiting on its circumference a helical profile linearly driving a sliding yoke mounted so as to slide on a guide bar parallel to the axle of the said shaft and actuating a switch at a defined point in its travel over the said helical profile.

Such a device is particularly intended to control the automatic stopping of blinds, flaps or gates which are driven by a geared motor.

PRIOR ART

Such a device is known from U.S. Pat. No. 4,238,021. In this device the helical profile is constituted by a steel wire wound in a helix around the shaft and fixed at its ends onto two cams which are integral with the shaft. The helical wire passes through one arm of the sliding yoke which is thus driven along the helix. The guide bar of the sliding yoke is fixed by being embedded at on of its ends and the actuating of the switch is effected by lateral displacement of the sliding yoke by one of the cams of the shaft, the displacement of the sliding yoke being allowed by the bending of its guide bar. The setting-up of this device is relatively lengthy and tricky. In fact, according to whether the initial or preset stop positions are situated upstream or downstream from the desired stop positions, the method of setting up is different and, a priori, the user does not know the upstream/-downstream situation of these positions. He is thus led, in the first place, to carry out a few tests in order to locate these positions. If the initial stop positions are upstream from the desired stop positions, the user must first actuate the electric motor until it stops automatically at this initial stop position, then make the helix and the cam drive in rotation in such a way as to bring about the closing of the switch, the restarting of the motor and the displacement of the windable element controlled by the motor, the helix having to be driven manually until the windable element is in the desired position. Hysteresis due to the reaction time of the user and the elements in movement is inevitable, which has the effect of offsetting the effective stopping point and of necessitating adjustments. If the initial stop positions are downstream of the desired stop positions, the user must first of all actuate the electric motor until the windable element is in the desired position, then manually drive the helix in rotation in such a way as to bring the cam into contact with the switch in order to cut off the supply to the motor. This latter operation can only be effected by trial and error, that is to say by repeating these operations until the point of the application of power to the motor does not bring about rotation of the motor.

The present invention has the aim of producing an automatic stop device making possible rapid, precise and unequivocal setting-up.

SUMMARY OF THE INVENTION

The automatic stop device according to the invention is defined in that the said shaft is constituted by a lead screw, and in that the sliding yoke comprises a part which is shaped in profile engaged into the lead screw, and in that the guide bar of the sliding yoke is mounted on a rocker arm making it possible to move the sliding yoke away from the lead screw and comprises a spring acting axially on the sliding yoke so as to instantaneously bring the sliding yoke into the position in which it actuates the said switch during its movement away from the lead screw.

Thus, starting from any position of the sliding yoke, it is possible, by one simple action on the rocker arm, to instantaneously bring the sliding yoke into initial position, that is to say into the stop position of the motor. In this position, the motor can be supplied and the windable element which it controls can be driven and brought into the desired stop position without the sliding yoke leaving its initial position. When the rocker arm is released into its normal position, the device is set up.

The switch can be actuated either by the axial displacement of the sliding yoke, or by its lateral displacement by a cam which is integral with the lead screw, the presence of a rocker arm favoring this second solution.

According to one preferred embodiment of the invention, the lead screw is disengageable and the axle of the rocker arm is equipped with a radial lever successively carrying out the disengagement of the lead screw and a precisely determined initial positioning of the latter during the driving of the shaft by means of a bistable pusher. The same axle can be used in order to actuate a shunt switch short-circuiting the stop switch and thus making it possible to supply the motor in the removed position of the rocker arm. All these functions are fulfilled by a device of simple and compact construction.

BRIEF DESCRIPTION OF THE DRAWINGS

The attached drawing represents, by way of example, an embodiment of the device according to the invention.

DESCRIPTION OF THE PREFERRED EMBODIMENT

Figure 1:
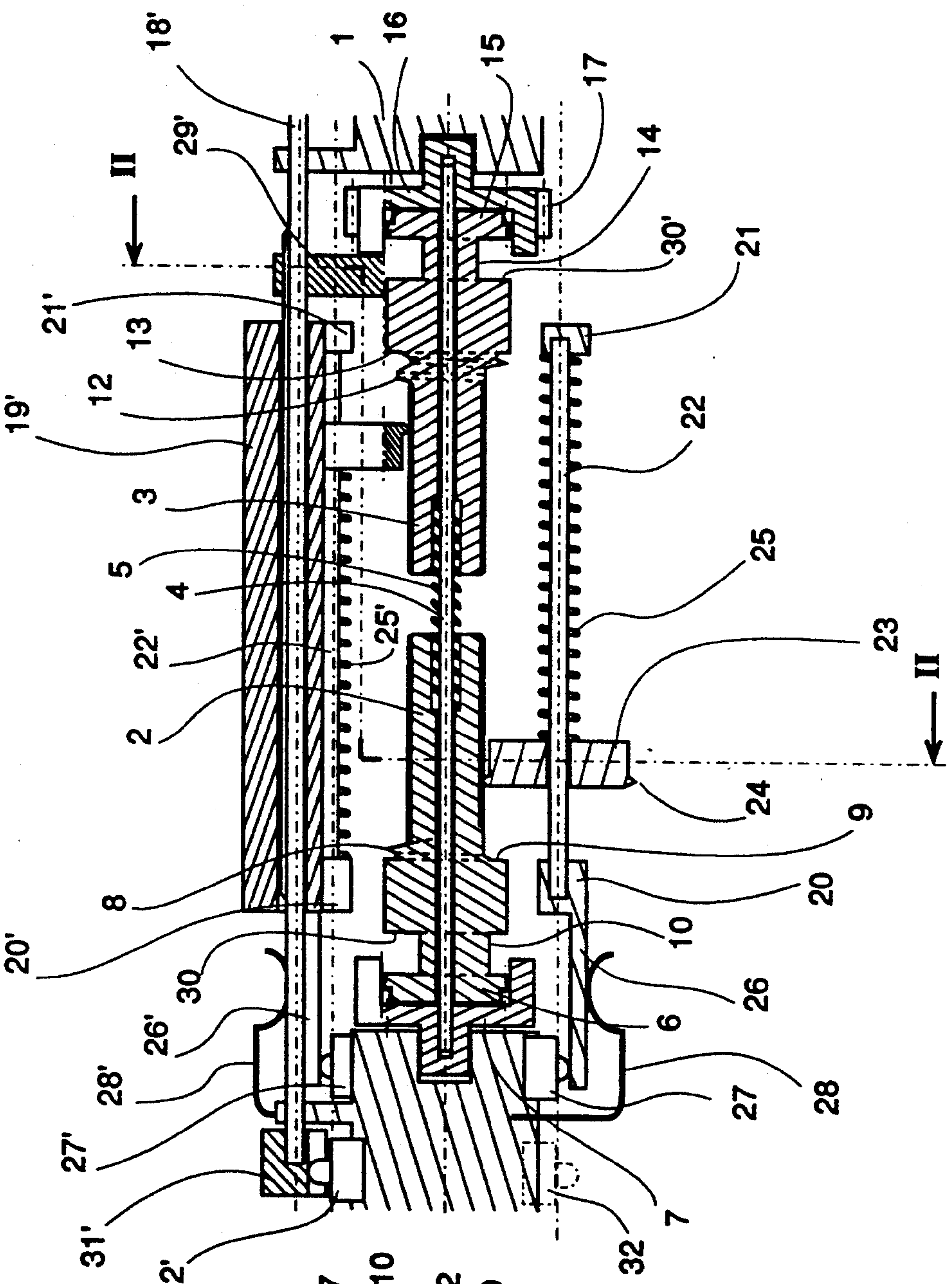
FIG. 1 is a sectional view along I—I of FIG. 2 of an automatic stop device with two lead screws and two sliding yokes, in an intermediate position of these sliding yokes.
Figure 2:
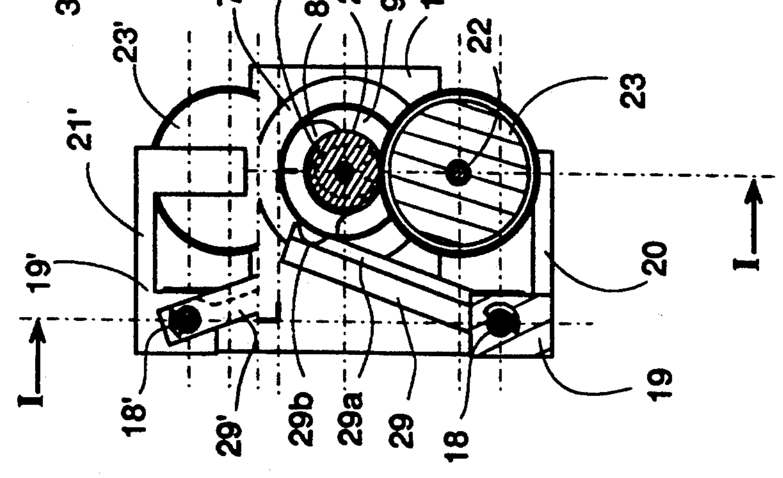
FIG. 2 is a sectional view along II—II of FIG. 1.

Refer to FIGS. 1 and 2.

The device shown comprises a structure 1 in the form of a cradle on which are mounted the various movable elements of the stop device as well as the switches and the means of control.

The device comprises two lead screws 2 and 3 mounted coaxially and freely on a common axle 4 and pushed towards each of the extremities of this axle by a common helical spring 5 arranged between the lead screws. The end of the lead screw 2 opposite the spring 5 is equipped with a toothed crown wheel 6 meshing, under the thrust of the spring 5, with the inner toothing of a crown wheel 7 fixed to the axle 4. The thread of the lead screw 2 is elongated backwards by a part of increasing diameter in a spiral constituting a cam 8. This cam 8 is terminated at the rear by a stop 9. Between the crown wheel 6 and the stop 9, the body of the lead screw 2 exhibits a part in the shape of a heart-shaped cam 10.

In a similar way, the lead screw 3 exhibits a spiral cam 12, a stop 13, a heart-shaped cam 14 and a toothed crown wheel 15 meshing, under the thrust of the spring 5, with the inner toothing of a toothed crown wheel 16 fixed to the axle 4 and equipped with an external toothing 17 meshing with the movable part at the output of the gear train associated with the motor to be controlled.

Figure 8:
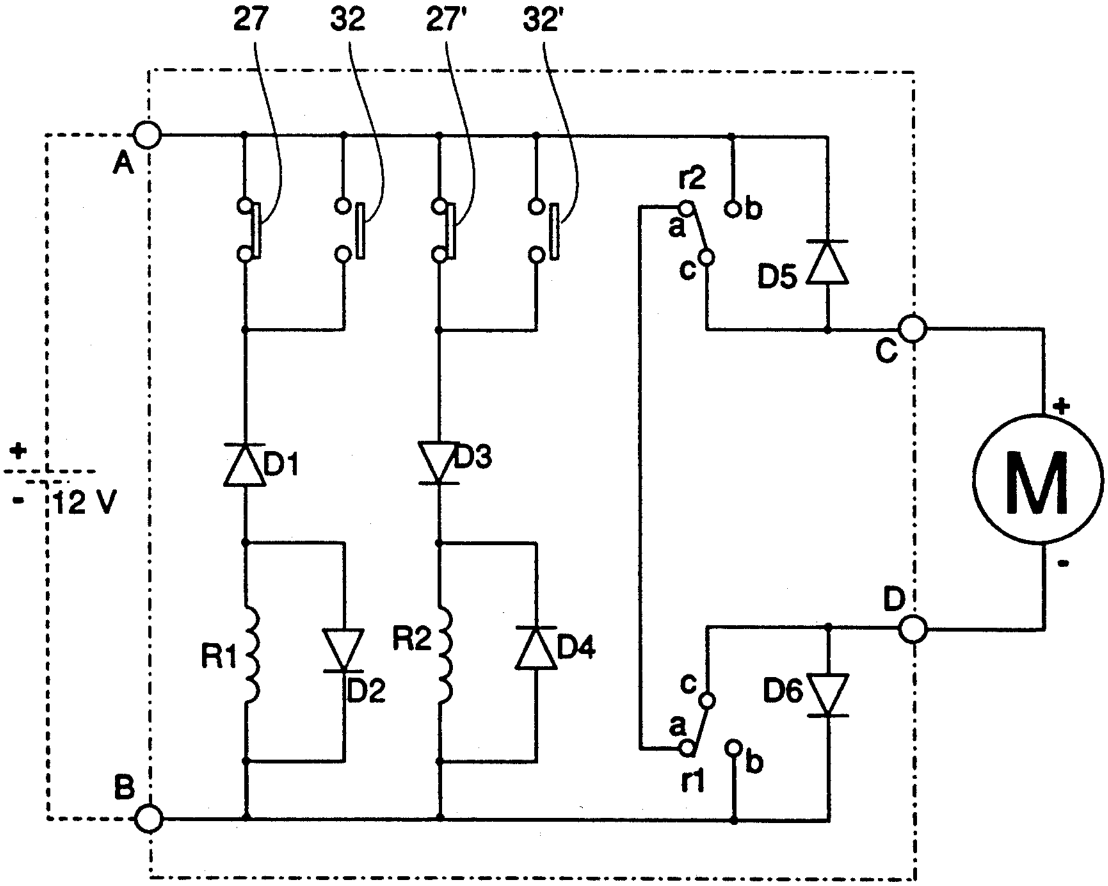
FIG. 8 shows the electrical control diagram of the motor.

On the structure 1 is mounted parallel to the lead screws, an axle 18 (FIG. 2) on which is mounted a rocker arm 19 which is integral in rotation, with a certain angular play, with the axle 18. This rocker arm 19 is equipped with two transverse arms 20 and 21 supporting a cylindrical guide bar 22 on which is freely mounted a circular sliding yoke 23 equipped with a ridge 24 engaged in the thread of the lead screw 2. The guide bar 22 is surrounded by a helical spring 25 compressed between the sliding yoke 23 and the arm 21. The arm 20 of the rocker arm exhibits, approximately in the elongation of the bar 22, a longitudinal arm 26 interacting with a switch 27 and on which acts a spring 28 holding, on the one hand, the sliding yoke 23 in gear with the lead screw 2 and, on the other hand, the switch 27 actuated. This switch is closed when it is actuated (FIG. 8).

In addition, on the axle 18 of the rocker arm is fastened, with angular play, a radial arm 29 exhibiting on the one hand a bezel 29*a* and on the other hand a notch 29*b*. The arm 29 is positioned on the axle 18 such that when it is driven in rotation in the direction of the lead screw 2, its bezel 29*a* comes to stop against the pointed edge 30 of the lead screw by acting on the latter as a cam pushing back the lead screw 2 towards the right by compressing the spring 5 and disengaging the lead screw from the crown wheel 7.

While following its travel, the arm 29 comes, by virtue of its notch 29*b* to actuate the heart-shaped cam 10 and to position this heart-shaped cam in a known way, for example like the zero reset hammer of a timepiece.

The other lead screw 3 interacts with identical means designated by the same references accompanied by the sign '. These means are mounted head-to-tail relative to the first means, with the exception of the rocker arm 19' and of its arms, of the spring 28' and of the switch 27' which are situated opposite the corresponding elements of the first means. In the upper part of FIG. 1, a cam 31' can additionally be distinguished fixed to the end of the axle 18' of the rocker arm, a cam intended to actuate a switch 32' which short-circuits the switch 32' in actuated position. The axle 18 of the first means is equipped with a cam which is identical to the cam 31', but not visible on the drawing and actuating a shunt switch 32 shown in dots and dashes as it is not visible on the section.

Figures 5, 6, 7:
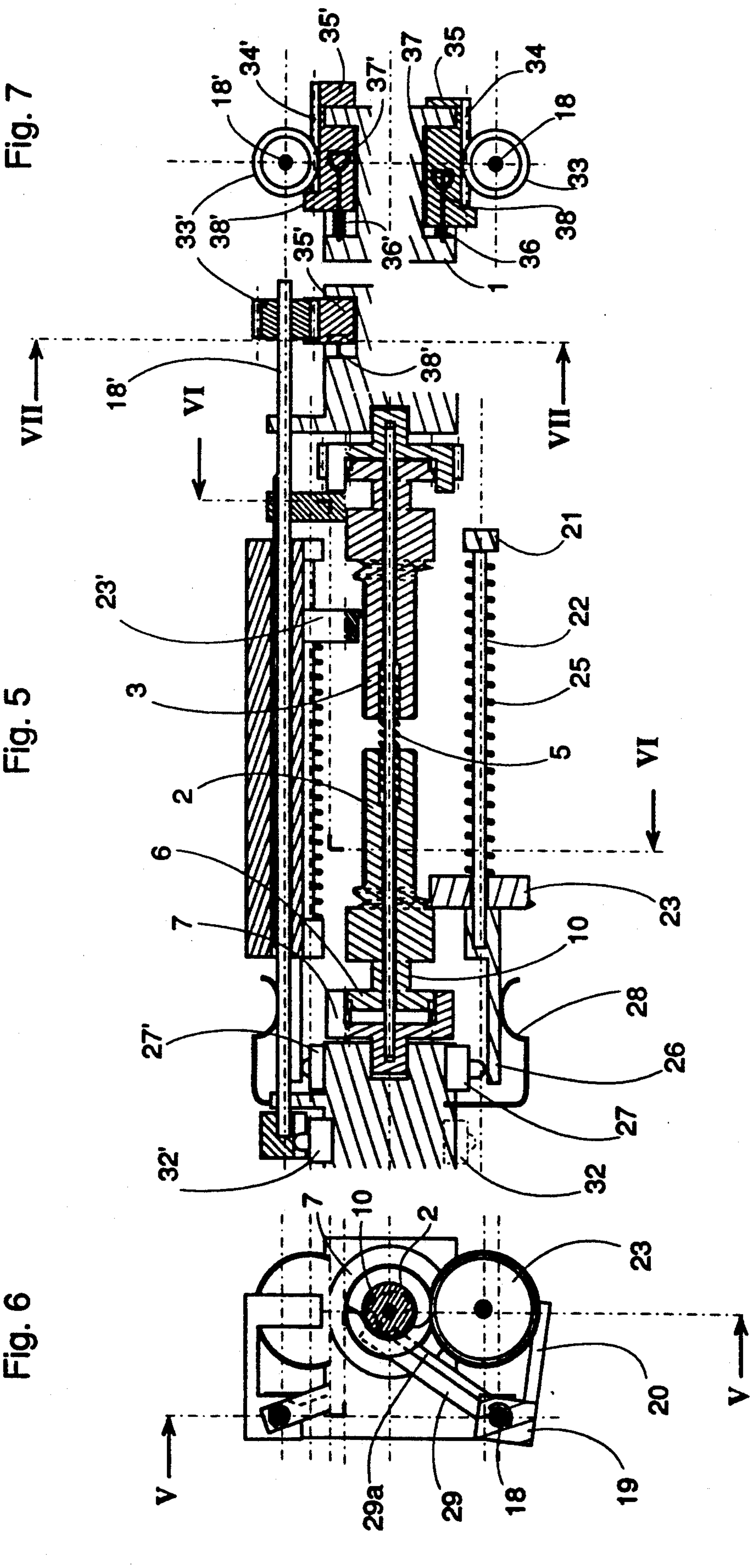
FIG. 5 shows the same device with one of the sliding yokes in initial position along a section V—V of FIG. 6.
FIG. 6 is a sectional view along VI—VI of FIG. 5.
FIG. 7 is a sectional view along VII—VII of FIG. 5 showing the bistable actuating pushers of the rocker arms.

As can be seen in FIG. 2, the axles 18 and 18' drive the rocker arms via a profile in the form of a sector with a certain angular play. Arms 29 and 29' are driven in the same way with a small angular play. The role of these plays will be made clear during the description of the operation of the device. On the axles 18 and 18' of the rocker arms are fixed, in addition, pinions 33 and 33' (FIGS. 5 and 7). The pinion 33 meshes with a rack 34 of a pusher 35 mounted in a housing at the end of the structure 1. This pusher 35 comprises a spring 36 and it laterally exhibits a heart-shaped groove 37 in which engages the bent end of a wire spring 38. This configuration which is well known per se provides two stable positions for the pusher 35, i.e. a retracted position, as shown for the pusher 35, and a non retracted position, as shown for the corresponding pusher 35'. The pushers 35 and 35' thus make it possible to hold the two corresponding axles 18 and 18' in two defined positions. From this the necessity for angular plays in the driving of the rocker arms and the disengaging arms is evident.

The electrical supply circuit of the motor is shown in FIG. 8. The motor M is a direct current motor supplied by a source of current of 12 V via an invertor switch which is not shown. The switches 27 and 27' are shown in actuated position and the switches 32 and 32' in non-actuated position. The positions correspond to intermediate positions of the sliding yokes 23 and 23'. The switches 27 and 32 are mounted in series with a diode D1 and a relay R1, while the switches 27' and 32' are mounted in parallel, in series with a diode D3 and a relay R2. The diodes D1, D3 are opposite and parallel. Between the terminals of the windings of each of the relays R1, R2 are mounted, opposite and parallel, free-wheel diodes D2 and D4. The relays R1 and R2 are equipped with an invertor contact r1, respectively r2 shown at rest and whose common points c are connected respectively to each of the terminals of the motor M. In parallel with the contact r1 is connected a diode D6 permitting the passage of current in the motor when the contact r1 is in rest position as shown in the drawing. In the same way, a diode D5 is connected in parallel to the contact r2. When the circuit is supplied with the polarity shown in the drawing, the current passes through the switch 27', the diode D3 and the relay R2 which is then excited. The contact r2 passes to the position b and the current can pass through the motor M through the contact r2 and the diode D6. For the other direction of rotation of the motor M, it is the relay R1 which is excited and the motor is supplied through the contact r1 on terminal b and diode D5.

Figures 3, 4:
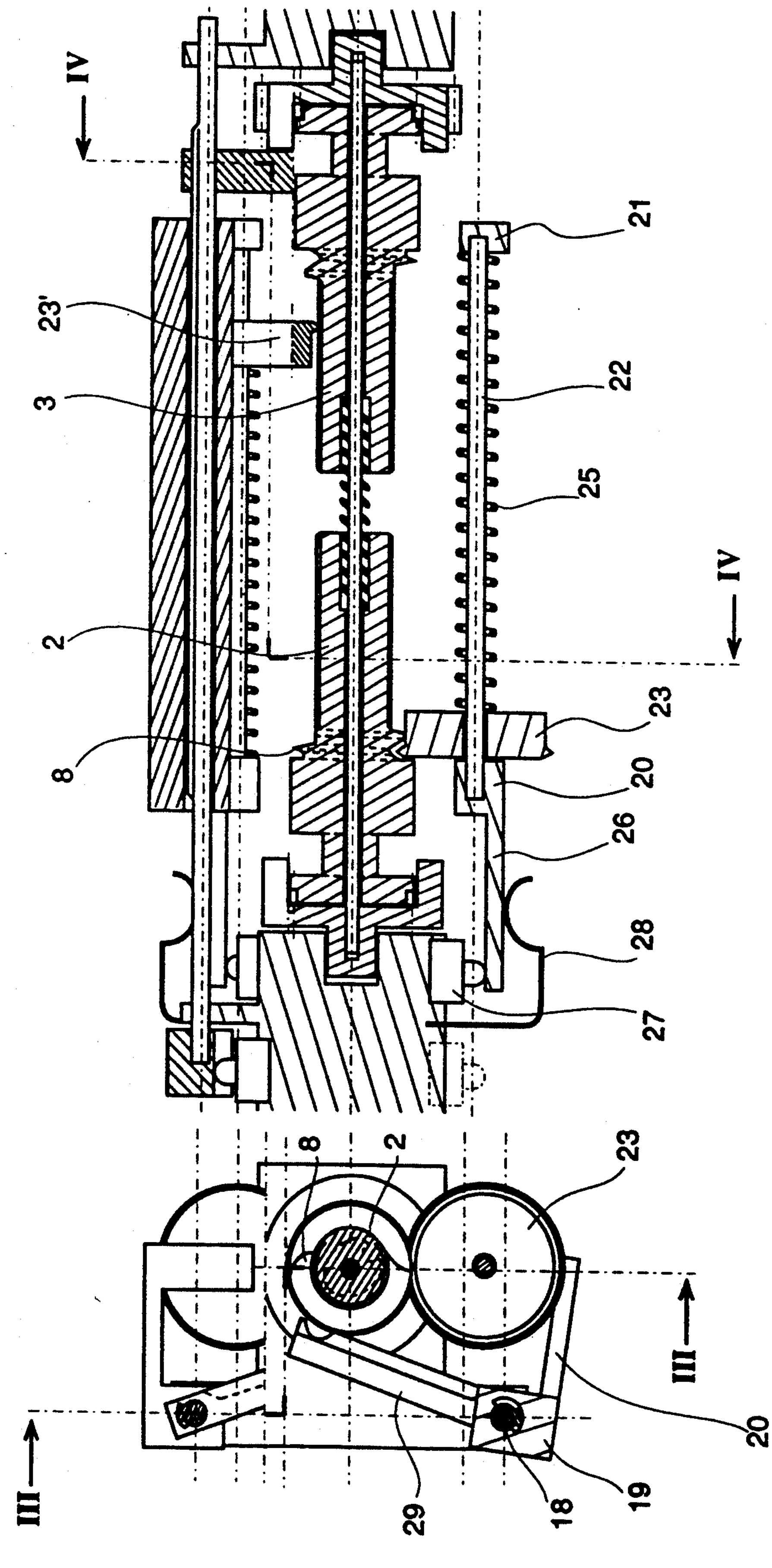
FIG. 3 shows the same device with one of the sliding yokes at the end of travel along a section III—III of FIG. 4.
FIG. 4 is a sectional view along IV—IV if FIG. 3.

The operation of the device is as follows:

Assume first of all that the sliding yokes 23 and 23' are in any position, for example the position shown in FIG. 1. When the motor turns, the two sliding yokes are each driven by their lead screw in opposite directions. Assume that the sliding yokes move in the direction of their cam 8 and 8'. The first sliding yoke which mounts onto its cam, for example the sliding yoke 23 drives the rocker arm 19 which can rock freely on its axle 18 by reason of the angular play provided for this purpose. The arm 26 ceases to actuate the contact 27 which opens bringing about the stopping of the motor (FIGS. 3 and 4).

The setting of the high and low stopping points of a blind will be described by means of FIGS. 5 and 6.

The two pushers 35 and 35' are retracted into their second position. The two rocker arms 19 and 19' are thus moved away from the lead screws and the sliding yokes 23 and 23' are instantaneously brought into their initial position by their springs 25 and 25', that is to say abutting against the stops 9 and 13 as shown in FIG. 5 for the sliding yoke 23 and the pusher 35. The retraction of the pusher 35 has the additional effect, at the end of a certain travel determined by the play of the arm 29 on the axle 18, of driving the arm 29 which successively disengages the lead screw 2 and positions this lead screw in angular position via its heart-shaped cam 10. It is the same for the lead screw 3. Simultaneously, the shunt contacts 32 and 32, are closed making it possible to supply the motor. As a result, it is possible to supply the motor and to bring the windable element into a first stop position, for example that determined by the sliding yoke 23. It is then sufficient to again press on the push-button 35 in order to bring the rocker arm into its rest position shown in FIG. 1. The lead screw 2 is again engaged and the sliding yoke 23 is engaged with it. The setting-up of the first stopping point is thus terminated.

A reverse voltage is next applied to the motor in order to drive it in the other direction and the setting-up of the other stopping point is carried out in the same manner by means of the pusher 35'.

The setting-up of the two stopping points is thus carried out very rapidly, by the use of simple operations without risk of error and with very great precision given the setting to zero of the lead screws by means of the heart-shaped cams.

In one simplified version, it would, needless to say, be possible to do without the heart-shaped cams, a precise angular initial position of the lead screws not being necessary in every case.

As already mentioned in the introduction, the end of travel switches could be actuated in a direction parallel to the axis of the lead screws. In this case, the cams 8 and 8' are not necessary.

According to a simplified embodiment, the disengagement of the lead screws could also be dispensed with.

According to another simplified embodiment of the invention, the bistable means of positioning the rocker arms, constituted by the pushers 35 and 35', could be removed and the rocker arms held away by another means.

The actuating cams of the sliding yokes could have another shape.

If only one stopping point is desired, the device could comprise a single lead screw and a single sliding yoke.

We claim:

1. An automatic stop device for an electric motor after a certain number of revolutions, comprising a shaft (2) driven in rotation by the motor and exhibiting on the circumference of the shaft a helical profile linearly driving a sliding yoke (23) mounted so as to slide on a guide bar (22) parallel to an axle of the said shaft and actuating a switch (27) at a defined point in travel of the sliding yoke over said helical profile, wherein the said shaft is constituted by a lead screw (2), and wherein the sliding yoke (23) comprises a part which is shaped in profile (24) engaged into the lead screw, and wherein the guide bar (22) of the sliding yoke is mounted on a rocker arm (19) making it possible to move the sliding yoke away from the lead screw and comprises a spring (25) acting axially on the sliding yoke so as to instantaneously bring the sliding yoke into the position in which it actuates the said switch during movement of the sliding yoke away from the lead screw.

2. An automatic stop device as claimed in claim 1, in which the lead screw is mounted to be axially on an axle (4) and held engaged by a spring (5) with a moving part (7) kinematically linked to the motor, wherein a radial arm (29) which is integral with the rocker arm and exhibits a profile (**29*a***) such that, when the rocker arm has been moved away, the profile comes to push on and disengage the lead screw.

3. A device as claimed in claim 2, wherein the lead screw (2) carries a heart-shaped cam (10) situated on the trajectory of the said radial arm (29) and actuated by the radial arm, after disengagement of the lead screw, in order to provide precise initial angular positioning of the lead screw.

4. A device as claimed in claim 1, wherein the lead screw comprises, at one of its ends, a cam (8) bringing about the radial movement of the sliding yoke, and the actuation of the switch (27) by the movement of the sliding yoke, wherein the said cam (8) is constituted by an elongation in the form of a spiral of the thread of the lead screw.

5. A device as claimed in claim 4, which comprises a second switch (32), actuation of which has the effect of short-circuiting the first switch, a member actuating this second switch when the rocker arm and bistable means of actuating (35) the rocker arm has been moved away, configured in such a way as to hold the sliding yoke, in a first position, in gear with the lead screw and, in a second position, to hold the rocker arm away and the second switch actuated.

6. A device as claimed in claim 1, wherein the rocker arm (19) and a radial arm (29) are coaxially linked to a control axle (18) with angular play such that the radial arm is not driven when the rocker arm is moved away by the action of a heart-shaped cam on the sliding yoke, and that when the said control axle is actuated by the said bistable actuating means in order to be moved away from the lead screw, the control axle successively brings about the movement of the sliding yoke away from the lead screw, the driving of the radial arm and thereby the disengagement of the lead screw, then its angular positioning of the sliding yoke by the heart-shaped cam and the actuation of a second switch.

7. An automatic stop device as claimed in claim 1 which is a double device so as to provide two stopping points for two different directions of rotation of the motor and wherein two lead screws (2,3) are coaxial.

8. An automatic stop device as claimed in claim 7, wherein a first switch (27) and a first shunt switch (32) are connected between the terminals of a source of direct current supply with reversible polarity and in series with a first diode (D1) and a first relay (R1) between the terminals of which is connected a first free-wheel diode (D2), wherein a second switch (271) and a second shunt switch (321) are connected between the terminals of the direct current source and in series with a second diode (D3) parallel and opposite to the first diode (D1) and a second relay (R2) between the terminals of which is connected a second free-wheel diode (D4), and wherein each of the relays comprises an invertor contact (r1, r2) whose common points are connected to each of the terminals of the motor (M), diodes (D5, D6) connected in parallel to the invertor contact providing the passage of the current towards the source.

* * * * *